US012572279B1

(12) United States Patent
Arora et al.

(10) Patent No.: US 12,572,279 B1
(45) Date of Patent: Mar. 10, 2026

(54) THERMAL SHUTDOWN HANDLING IN DATA STORAGE DEVICE

(71) Applicant: Sandisk Technologies, Inc., Milpitas, CA (US)

(72) Inventors: Lovleen Arora, Bangalore (IN); Lovish Singla, Bangalore (IN); Anamika Choudhary, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/989,133

(22) Filed: Dec. 20, 2024

(51) Int. Cl.
*G06F 3/06* (2006.01)

(52) U.S. Cl.
CPC ............ *G06F 3/061* (2013.01); *G06F 3/0653* (2013.01); *G06F 3/0659* (2013.01); *G06F 3/0679* (2013.01)

(58) Field of Classification Search
CPC ...... G06F 3/061; G06F 3/0653; G06F 3/0659; G06F 3/0679
USPC .................................................. 711/103, 102
See application file for complete search history.

(56) References Cited

U.S. PATENT DOCUMENTS

| | | | |
|---|---|---|---|
| 9,304,937 | B2 | 4/2016 | Achilles et al. |
| 10,013,194 | B1 * | 7/2018 | Yang ..................... G06F 3/0652 |
| 10,025,522 | B2 | 7/2018 | Helmick |
| 10,817,191 | B2 | 10/2020 | Bar et al. |
| 11,886,260 | B2 | 1/2024 | Gunda et al. |
| 11,886,708 | B2 | 1/2024 | Wu |
| 2022/0206920 | A1 * | 6/2022 | Bhat ..................... G06F 3/0653 |
| 2023/0315313 | A1 | 10/2023 | Gunda et al. |
| 2023/0367378 | A1 * | 11/2023 | Vaysman .............. G06F 1/3221 |

* cited by examiner

*Primary Examiner* — Hosain T Alam
*Assistant Examiner* — Zubair Ahmed
(74) *Attorney, Agent, or Firm* — LOZA & LOZA, LLP; Gabriel Fitch

(57) ABSTRACT
Methods and apparatus for thermal management in data storage devices are provided. A data storage device includes a first non-volatile memory (NVM), and one or more processors coupled to the first NVM. The one or more processors are configured to receive, from a host, a host command to be performed in connection with the first NVM, the host command comprising a starting logical block address (LBA) and a transfer length, store the starting LBA and the transfer length in a second NVM, attempt to perform the host command, detect, before completion of the performance of the host command, a thermal shutdown state of the first NVM, and invalidate, using the stored starting LBA and the stored transfer length, residual data stored in the first NVM in association with partial completion of the host command prior to the thermal shutdown state.

20 Claims, 8 Drawing Sheets

300

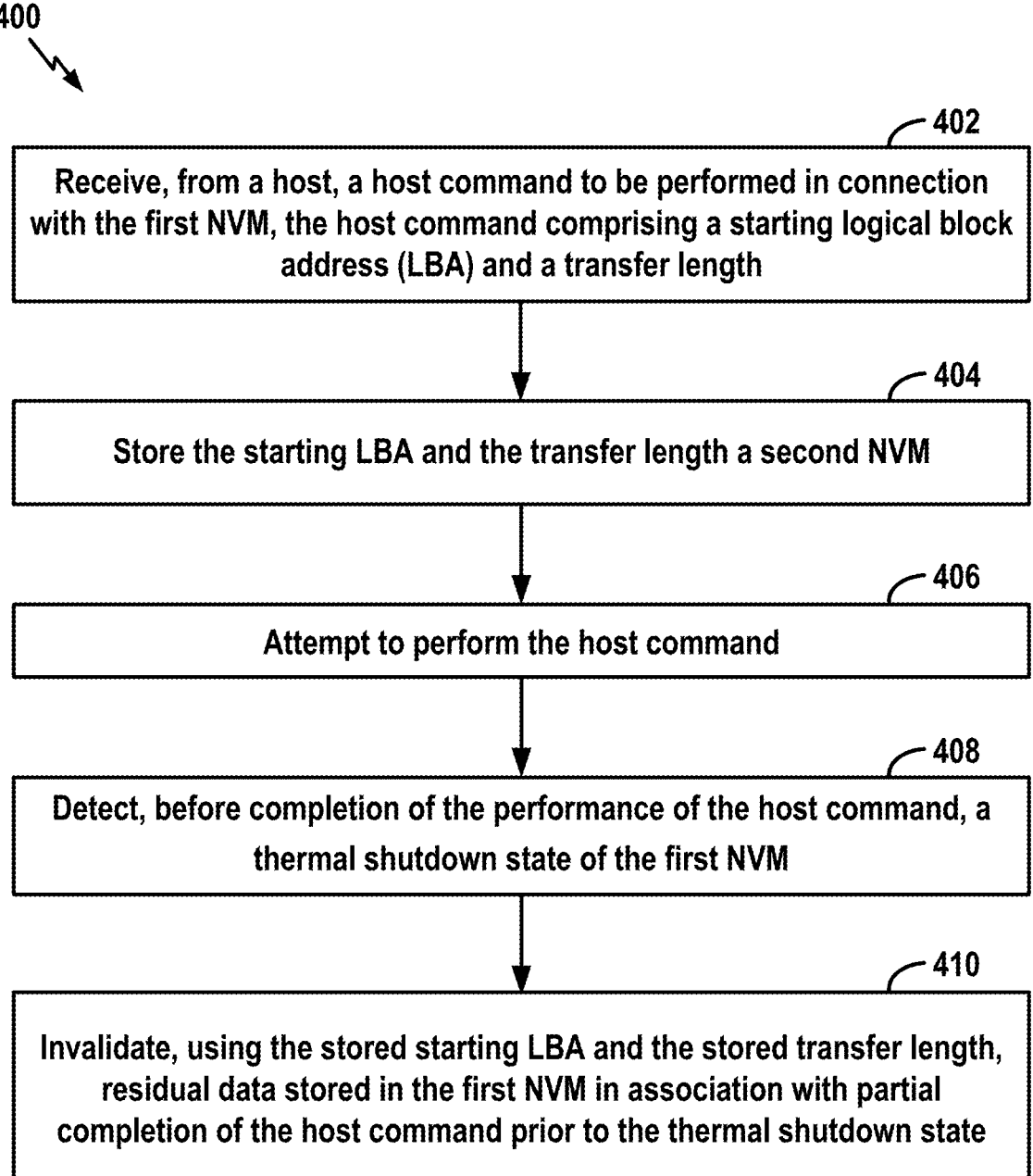

400

402

Receive, from a host, a host command to be performed in connection with the first NVM, the host command comprising a starting logical block address (LBA) and a transfer length

404

Store the starting LBA and the transfer length a second NVM

406

Attempt to perform the host command

408

Detect, before completion of the performance of the host command, a thermal shutdown state of the first NVM

410

Invalidate, using the stored starting LBA and the stored transfer length, residual data stored in the first NVM in association with partial completion of the host command prior to the thermal shutdown state

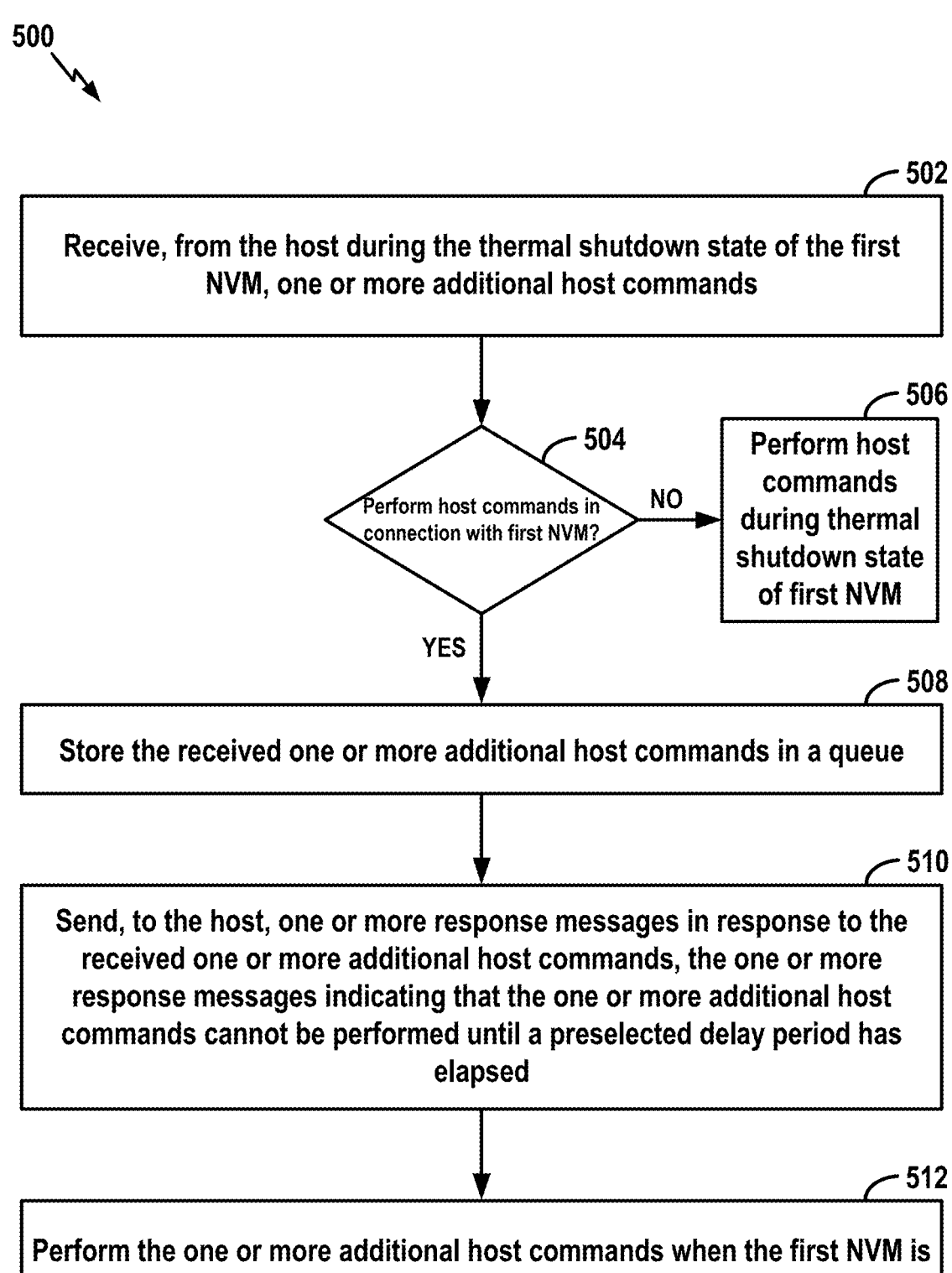

502

Receive, from the host during the thermal shutdown state of the first NVM, one or more additional host commands

504

Perform host commands in connection with first NVM?

NO → 506

Perform host commands during thermal shutdown state of first NVM

YES

508

Store the received one or more additional host commands in a queue

510

Send, to the host, one or more response messages in response to the received one or more additional host commands, the one or more response messages indicating that the one or more additional host commands cannot be performed until a preselected delay period has elapsed

512

Perform the one or more additional host commands when the first NVM is no longer in the thermal shutdown state

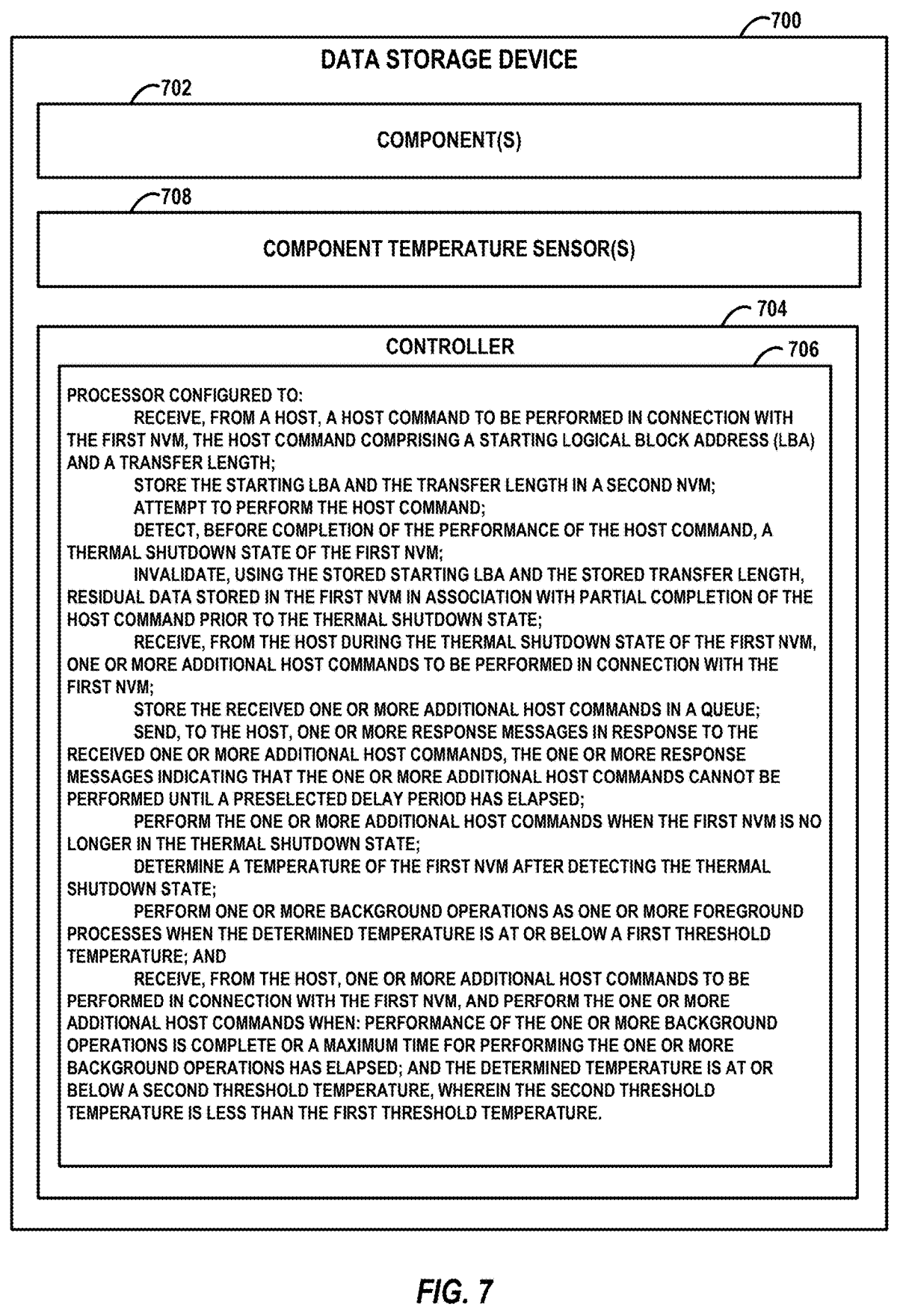

┌─────────────────────────────────────────────────────────┐
│ ╭─700                                                     │
│ DATA STORAGE DEVICE                                       │
│   ╭─702                                                   │
│ ┌───────────────────────────────────────────────────────┐│
│ │                                                       ││
│ │              COMPONENT(S)                             ││
│ │                                                       ││
│ └───────────────────────────────────────────────────────┘│
│   ╭─708                                                   │
│ ┌───────────────────────────────────────────────────────┐│
│ │                                                       ││
│ │       COMPONENT TEMPERATURE SENSOR(S)                 ││
│ │                                                       ││
│ └───────────────────────────────────────────────────────┘│

╭─ 704

CONTROLLER                            ╭─ 706

PROCESSOR CONFIGURED TO:
    RECEIVE, FROM A HOST, A HOST COMMAND TO BE PERFORMED IN CONNECTION WITH
THE FIRST NVM, THE HOST COMMAND COMPRISING A STARTING LOGICAL BLOCK ADDRESS (LBA)
AND A TRANSFER LENGTH;
    STORE THE STARTING LBA AND THE TRANSFER LENGTH IN A SECOND NVM;
    ATTEMPT TO PERFORM THE HOST COMMAND;
    DETECT, BEFORE COMPLETION OF THE PERFORMANCE OF THE HOST COMMAND, A
THERMAL SHUTDOWN STATE OF THE FIRST NVM;
    INVALIDATE, USING THE STORED STARTING LBA AND THE STORED TRANSFER LENGTH,
RESIDUAL DATA STORED IN THE FIRST NVM IN ASSOCIATION WITH PARTIAL COMPLETION OF THE
HOST COMMAND PRIOR TO THE THERMAL SHUTDOWN STATE;
    RECEIVE, FROM THE HOST DURING THE THERMAL SHUTDOWN STATE OF THE FIRST NVM,
ONE OR MORE ADDITIONAL HOST COMMANDS TO BE PERFORMED IN CONNECTION WITH THE
FIRST NVM;
    STORE THE RECEIVED ONE OR MORE ADDITIONAL HOST COMMANDS IN A QUEUE;
    SEND, TO THE HOST, ONE OR MORE RESPONSE MESSAGES IN RESPONSE TO THE
RECEIVED ONE OR MORE ADDITIONAL HOST COMMANDS, THE ONE OR MORE RESPONSE
MESSAGES INDICATING THAT THE ONE OR MORE ADDITIONAL HOST COMMANDS CANNOT BE
PERFORMED UNTIL A PRESELECTED DELAY PERIOD HAS ELAPSED;
    PERFORM THE ONE OR MORE ADDITIONAL HOST COMMANDS WHEN THE FIRST NVM IS NO
LONGER IN THE THERMAL SHUTDOWN STATE;
    DETERMINE A TEMPERATURE OF THE FIRST NVM AFTER DETECTING THE THERMAL
SHUTDOWN STATE;
    PERFORM ONE OR MORE BACKGROUND OPERATIONS AS ONE OR MORE FOREGROUND
PROCESSES WHEN THE DETERMINED TEMPERATURE IS AT OR BELOW A FIRST THRESHOLD
TEMPERATURE; AND
    RECEIVE, FROM THE HOST, ONE OR MORE ADDITIONAL HOST COMMANDS TO BE
PERFORMED IN CONNECTION WITH THE FIRST NVM, AND PERFORM THE ONE OR MORE
ADDITIONAL HOST COMMANDS WHEN: PERFORMANCE OF THE ONE OR MORE BACKGROUND
OPERATIONS IS COMPLETE OR A MAXIMUM TIME FOR PERFORMING THE ONE OR MORE
BACKGROUND OPERATIONS HAS ELAPSED; AND THE DETERMINED TEMPERATURE IS AT OR
BELOW A SECOND THRESHOLD TEMPERATURE, WHEREIN THE SECOND THRESHOLD
TEMPERATURE IS LESS THAN THE FIRST THRESHOLD TEMPERATURE.

*FIG. 7*

THERMAL SHUTDOWN HANDLING IN DATA STORAGE DEVICE

FIELD

The subject matter described herein relates to data storage devices. More particularly, the subject matter relates, in some examples, to the handling of operations involving a non-volatile memory of a data storage device before, during, and after thermal shutdown of the non-volatile memory to enhance a quality of service (QoS) of the data storage device.

INTRODUCTION

As flash memory technologies have advanced toward ultra-high capacity products, the packaging and performance requirements of such high capacity products have brought about thermal-related issues degrading performance. Such issues have been resolved using different thermal throttling schemes. For example, a storage device may implement various thermal throttling schemes when the temperature of the device exceeds predefined temperature limits. In particular, when a temperature of a non-volatile memory (e.g., NAND) of the storage device exceeds a predefined temperature limit, the storage device may invoke a shutdown of the non-volatile memory upon which the non-volatile memory enters a sleep state. Consequently, during shutdown the storage device may discard any ongoing host commands being performed in the non-volatile memory leading to the failure or partial completion of the host commands. The storage device may also stop accepting any new host commands and may wait for some time until the non-volatile memory cools (e.g., temperature falls below the predefined temperature limit) before resuming acceptance of any new host commands, thereby degrading the quality of service (QoS) provided to a user.

Accordingly, what is needed is a scheme for optimizing the storage device's internal operations before, during, and after a thermal shutdown of the storage device's non-volatile memory to enhance the QoS of the storage device.

SUMMARY

The following presents a summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a data storage device, including a first non-volatile memory (NVM), and one or more processors coupled to the first NVM. The one or more processors, individually or collectively, are configured to receive, from a host, a host command to be performed in connection with the first NVM, the host command including a starting logical block address (LBA) and a transfer length, store the starting LBA and the transfer length in a second NVM, attempt to perform the host command, detect, before completion of the performance of the host command, a thermal shutdown state of the first NVM, invalidate, using the stored starting LBA and the stored transfer length, residual data stored in the first NVM in association with partial completion of the host command prior to the thermal shutdown state, receive, from the host during the thermal shutdown state of the first NVM, one or more additional host commands to be performed in connection with first NVM, store the received one or more additional host commands in a queue, perform the one or more additional host commands when the first NVM is no longer in the thermal shutdown state, send, to the host, one or more response messages in response to the received one or more additional host commands, the one or more response messages indicating that the one or more additional host commands cannot be performed until a preselected delay period has elapsed, determine a temperature of the first NVM after detecting the thermal shutdown state, perform one or more background operations as one or more foreground processes when the determined temperature is at or below a first threshold temperature, receive, from the host, one or more additional host commands to be performed in connection with the first NVM, and perform the one or more additional host commands when performance of the one or more background operations is complete or a maximum time for performing the one or more background operations has elapsed, and the determined temperature is at or below a second threshold temperature, wherein the second threshold temperature is less than the first threshold temperature. In some aspects, the one or more processors, individually or collectively, are configured to receive, from the host during the thermal shutdown state of the first NVM, one or more additional host commands, determine whether the one or more additional host commands are to be performed in connection with the first NVM, and perform the one or more additional host commands during the thermal shutdown state of the first NVM in response to a determination that the one or more additional host commands are not to be performed in connection with the first NVM.

One aspect of the disclosure provides a method for use with a data storage device including a first non-volatile memory (NVM). The method includes receiving, from a host, a host command to be performed in connection with the first NVM, the host command including a starting logical block address (LBA) and a transfer length, storing the starting LBA and the transfer length in a second NVM, attempting to perform the host command, detecting, before completion of the performance of the host command, a thermal shutdown state of the first NVM, invalidating, using the stored starting LBA and the stored transfer length, residual data stored in the first NVM in association with partial completion of the host command prior to the thermal shutdown state, receiving, from the host during the thermal shutdown state of the first NVM, one or more additional host commands to be performed in connection with the first NVM, storing the received one or more additional host commands in a queue, performing the one or more additional host commands when the first NVM is no longer in the thermal shutdown state, sending, to the host, one or more response messages in response to the received one or more additional host commands, the one or more response messages indicating that the one or more additional host commands cannot be performed until a preselected delay period has elapsed, determining a temperature of the first NVM after detecting the thermal shutdown state, performing one or more background operations as one or more foreground processes when the determined temperature is at or below a first threshold temperature, receiving, from the host, one or more additional host commands to be performed in connection with the first NVM, and performing the one or more additional host commands when performance of the one or more background operations is complete or a maximum time for performing the one or more background operations has elapsed, and the determined temperature is at or below a second threshold temperature, wherein the second threshold temperature is less than the first threshold temperature.

One aspect of the disclosure provides a data storage device, including a first non-volatile memory, means for receiving, from a host, a host command to be performed in connection with the first NVM, the host command including a starting logical block address (LBA) and a transfer length, means for storing the starting LBA and the transfer length in a second NVM, means for attempting to perform the host command, means for detecting, before completion of the performance of the host command, a thermal shutdown state of the first NVM, means for invalidating, using the stored starting LBA and the stored transfer length, residual data stored in the first NVM in association with partial completion of the host command prior to the thermal shutdown state, means for receiving, from the host during the thermal shutdown state of the first NVM, one or more additional host commands to be performed in connection with the first NVM, means for storing the received one or more additional host commands in a queue, means for performing the one or more additional host commands when the first NVM is no longer in the thermal shutdown state, means for sending, to the host, one or more response messages in response to the received one or more additional host commands, the one or more response messages indicating that the one or more additional host commands cannot be performed until a preselected delay period has elapsed, means for determining a temperature of the first NVM after detecting the thermal shutdown state, means for performing one or more background operations as one or more foreground processes when the determined temperature is at or below a first threshold temperature, means for receiving, from the host, one or more additional host commands to be performed in connection with the first NVM, and means for performing the one or more additional host commands when performance of the one or more background operations is complete or a maximum time for performing the one or more background operations has elapsed, and the determined temperature is at or below a second threshold temperature, wherein the second threshold temperature is less than the first threshold temperature.

BRIEF DESCRIPTION OF THE DRAWINGS

FIGS. 4, 5, and 6 are flowcharts illustrating a thermal management process of a data storage device in accordance with some aspects of the disclosure.

FIG. 7 is a schematic block diagram illustrating an exemplary data storage device configured in accordance with some aspects of the disclosure.

DETAILED DESCRIPTION

Figure 1:
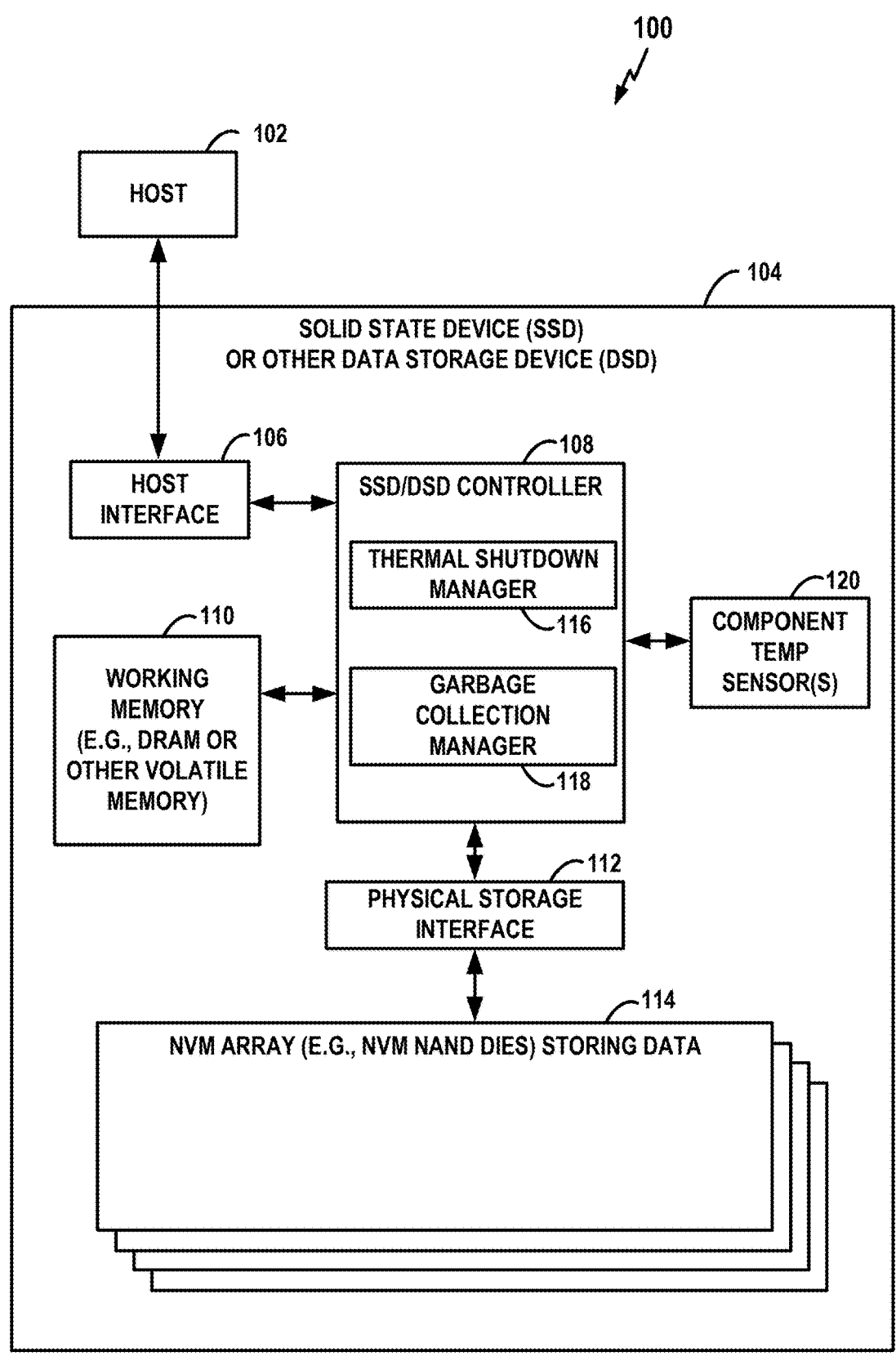
FIG. 1 is a schematic block diagram illustrating an exemplary data storage device (DSD) embodied as a solid-state device (SSD) including an SSD controller configured to control thermal management operations in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to thermal management of the DSDs. In the main examples described herein, data is stored within DSDs with non-volatile memory (NVM) arrays. In other examples, data may be stored in DSDs such as hard disk drives (HDDs) that store the data using magnetic recording techniques. DSDs with NVM arrays may be referred to as solid state devices (SSDs). Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

When a temperature of a non-volatile memory (NVM) (e.g., NAND) of a data storage device exceeds a predefined temperature limit (or threshold), the data storage device may invoke a thermal shutdown of the NVM. However, when the NVM is in the thermal shutdown state, any ongoing operations involving the NVM (e.g., host commands, such as read, write, and/or erase commands to be performed in connection with the NVM) are blindly discarded by the data storage device. Moreover, the data storage device stops accepting any further host commands (to perform operations involving the NVM) and will wait for some time until the NVM cools (e.g., NVM temperature falls below a preselected temperature limit) before again accepting further host commands. As such, the quality of service (QoS) of the data storage device is degraded, for example, as experienced by the host or a user.

To address the problems described above, an aspect of the present disclosure provides schemes to enhance the QoS by optimizing data storage device (DSD) operations before, during, and after the thermal shutdown of the NVM before proceeding with any further host commands. For example, although the NVM is stopped from performing any operations during thermal shutdown, the primary DSD/SSD processor (e.g., application-specific integrated circuit (ASIC)) and/or firmware may still be operational to perform tasks that do not involve the NVM (e.g., host command queueing, graceful handling of discarded host commands/residue data, etc.). The processor and/or firmware may also perform specific tasks that help reduce the chances of the NVM having to repeatedly enter a thermal shutdown state.

Exemplary Devices, Systems and Procedures

FIG. 1 is a schematic block diagram illustrating an exemplary data storage system including a data storage device (DSD) embodied as a solid-state device (SSD) including an SSD controller configured to control thermal management operations in accordance with some aspects of the disclosure. The system 100 includes a host 102 and the SSD 104 (or other DSD, but for simplicity referred to as an SSD below) coupled to the host 102. The host 102 provides commands to the SSD 104 for transferring data between the host 102 and the SSD 104. For example, the host 102 may provide a write command to the SSD 104 for writing data to the SSD 104 or a read command to the SSD 104 for reading data from the SSD 104. The host 102 may also provide an erase command to the SSD 104 for erasing data from the SSD 104. The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples.

The SSD 104 includes a host interface 106, an SSD or DSD controller 108, a working memory 110 (such as DRAM or other volatile memory), a physical storage (PS) interface 112 (e.g., flash interface module (FIM)), and a non-volatile memory (NVM) array 114 having one or more dies storing data. The host interface 106 is coupled to the controller 108 and facilitates communication between the host 102 and the controller 108. The controller 108 is coupled to the working memory 110 as well as to the NVM array 114 via the PS interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link. The NVM array 114 may include multiple dies.

In some examples, the host 102 may be a laptop computer with an internal SSD and a user of the laptop may wish to playback video stored by the SSD. In another example, the host again may be a laptop computer, but the video is stored by a remote server.

Although, in the example illustrated in FIG. 1, SSD 104 includes a single channel between controller 108 and NVM array 114 via physical storage (PS) interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM array 114 over one or more command channels.

The controller 108 controls operation of the SSD 104. In various aspects, the controller 108 receives commands from the host 102 through the host interface 106 and performs the commands to transfer data between the host 102 and the NVM array 114. Furthermore, the controller 108 may manage reading from and writing to working memory 110 for performing the various functions effected by the controller and to maintain and manage cached information stored in the working memory 110. In some embodiments, the controller 108 and/or the host interface 106 may be situated external to the SSD 104 and configured to manage data transfer to and from the NVM array 114 and/or the working memory 110 located within the SSD 104.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, application specific integrated circuit (ASIC), or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The SSD controller 108 includes a thermal shutdown manager 116, which can be configured to perform efficient thermal shutdown management as will be described in further detail below. In one aspect, the thermal shutdown manager 116 can enhance the SSD QoS by optimizing SSD operations before, during, and after the thermal shutdown of the NVM before proceeding with any further host commands. For example, although the NVM is stopped from performing any operations during thermal shutdown, the thermal shutdown manager 116 may still be operational to perform various tasks such as host command queueing, graceful handling of discarded host commands/residue data, and the like.

In one aspect, the thermal shutdown manager 116 is a module within the SSD controller 108 that is controlled by firmware. In one aspect, the thermal shutdown manager 116 may be a separate component from the SSD controller 108 and may be implemented using any combination of hardware, software, and firmware (e.g., like the implementation options described above for SSD controller 108) that can perform thermal management as will be described in further detail below. In one example, the thermal shutdown manager 116 is implemented using a firmware algorithm or other set of instructions that can be performed on the SSD controller 108 to implement the thermal management functions described below. The SSD controller 108 further includes a garbage collection manager 118 for controlling garbage collection of data.

The working memory 110 may be any suitable memory, computing device, or system capable of storing data. For example, working memory 110 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the working memory 110, or a portion thereof, to store data during the transfer of data between the host 102 and the NVM array 114. For example, the working memory 110 or a portion of the volatile memory 110 may be a cache memory. The NVM array 114 receives data from the controller 108 via the PS interface 112 and stores the data. In some embodiments, working memory 110 may be replaced by a non-volatile memory such as MRAM, PCM, ReRAM, etc. to serve as a working memory for the overall device.

The NVM array 114 (e.g., a first NVM) may be implemented using NAND flash memory. In one aspect, the NVM array 114 may be implemented using any combination of NAND flash, PCM arrays, MRAM arrays, and/or ReRAM. In one aspect, the SSD 104 includes a second NVM (not shown) that is configured to store various information including command information (e.g., starting logical block address (LBA) and transfer length) associated with the last command received by the SSD. In one aspect, the second NVM may be implemented using any combination of NAND flash, PCM arrays, MRAM arrays, ReRAM, and/or an always on RAM.

The PS interface 112 provides an interface to the NVM array 114. For example, in the case where the NVM array 114 is implemented using NAND flash memory, the PS interface 112 may be a flash interface module. In one aspect, the PS interface 112 may be implemented as a component of the SSD controller 108.

In the example of FIG. 1, the controller 108 may include hardware, firmware, software, or any combinations thereof that provide the functionality for the thermal shutdown manager 116.

Although FIG. 1 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the SSD controller 108 may be a controller in another type of device and still be configured to perform priority based thermal management and/or perform some or all of the other functions described herein.

Thermal Management of Data Storage Device

Figure 2:
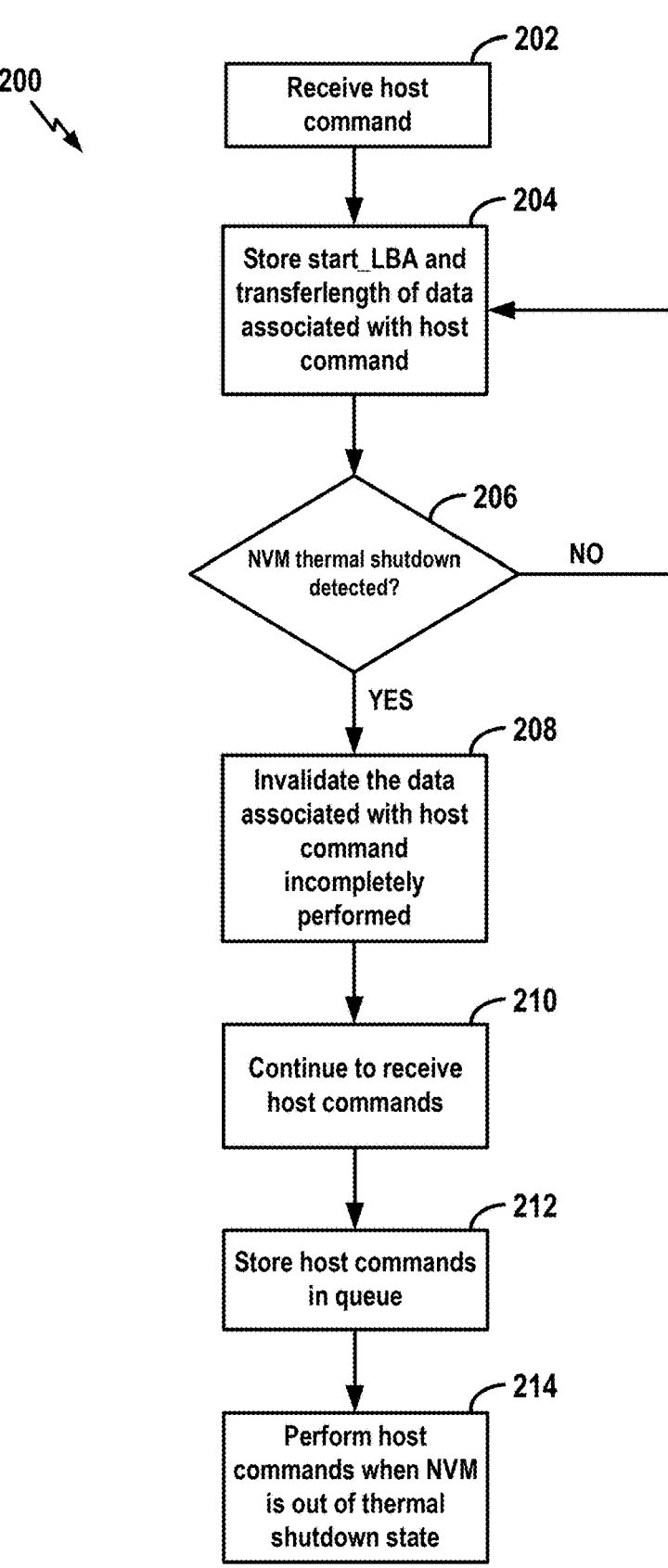
FIG. 2 is a flowchart illustrating a thermal management process for graceful handling of residue data due to discarded host operations during thermal shutdown of a non-volatile memory (NVM) in accordance with some aspects of the disclosure.

FIG. 2 is a flowchart illustrating a thermal management process 200 for graceful handling of residue data due to discarded host commands during thermal shutdown of a non-volatile memory (NVM) in accordance with some aspects of the disclosure. The process 200 may be performed by firmware running in the SSD/DSD controller 108 (or thermal shutdown manager 116) of the SSD 104 of FIG. 1, or any other suitably equipped device controller.

At block 202, the process receives a host command (e.g., from host 102) to perform an operation in connection with the NVM (e.g., NVM 114, that may include a NAND memory). For example, the host command may be a write, read, or erase command of data to be performed with respect to the NVM.

At block 204, the process stores a logical block address (LBA) or beginning LBA (start_LBA) of data associated with the host command in the NVM. The process also stores a transfer length of the data (e.g., block count) associated with the host command in the NVM.

At block 206, the process detects whether a thermal shutdown of the NVM has occurred. For example, the process may detect the thermal shutdown based on a signal from the thermal shutdown manager 116. If the thermal shutdown of the NVM is detected, then the process proceeds to block 208. Notably, during the thermal shutdown, any host commands not completely performed (e.g., a last received host command) prior to the thermal shutdown are discarded by the SSD/DSD controller 108 and residual data stored in the NVM in association with the incompletely performed host command will remain in the NVM.

At block 208, the process invalidates the residual data stored in the NVM in association with the incompletely performed host command based on the stored start_LBA and the stored transfer length of the data. In an aspect, if the incompletely performed host command is an incomplete write command, a location of the stored start_LBA and the stored transfer length of the data that was written to the NVM is forwarded (e.g., to the garbage collection manager 118) for garbage collection while the NVM is in the thermal shutdown state (e.g., upon the NVM cooling to a predetermined temperature as sensed by the one or more component temperature sensors 120). This avoids having to perform garbage collection once the NVM is active (out of the thermal shutdown state) when the host again sends the host command for the incomplete write command. In an aspect, if the incompletely performed host command is an incomplete erase command, the process may continue to erase the data associated with the erase command from the NVM based on a location of the stored start_LBA and the stored transfer length of the data when the NVM is active (out of the thermal shutdown state), or as part of a garbage collection process during (and/or post) the thermal shutdown state, prior to performing any additional host commands received from the host.

In an aspect, while the NVM is in the thermal shutdown state (to allow for NVM temperature cooling), the process may continue to support host commands (in one aspect, to receive but not perform such commands) for which the performance of their associated operations in connection with the NVM may be delayed until after the NVM is out of the thermal shutdown state. Accordingly, at block 210, the process may continue to receive host commands during the thermal shutdown of the NVM. At block 212, the received host commands may be stored in a queue (e.g., until the queue has reached full capacity) without any data transfer to and/or from the NVM (without NVM involvement). At block 214, the process may perform the operations associated with the stored host commands in connection with the NVM when the temperature of the NVM has cooled and is no longer in the thermal shutdown state.

In an aspect, as part of blocks 210, 212, or 214, the process may send one or more response messages to the host indicating that the operations associated with the host commands received during the thermal shutdown of the NVM cannot be performed. For example, if a host command requiring a NVM operation is received from the host during the thermal shutdown, then the process may send back to the host a command response having a bit set to indicate "illegal error" or "busy."

In an aspect, as part of blocks 210, 212, or 214, the process may service host commands received during the thermal shutdown of the NVM without performing a NVM operation. For example, if a discard command is received from the host during the thermal shutdown, then the process may send back to the host a "success" command response but forgo performing a NVM operation (e.g., when the discarding of data associated with the discard command is not guaranteed).

Figure 3:
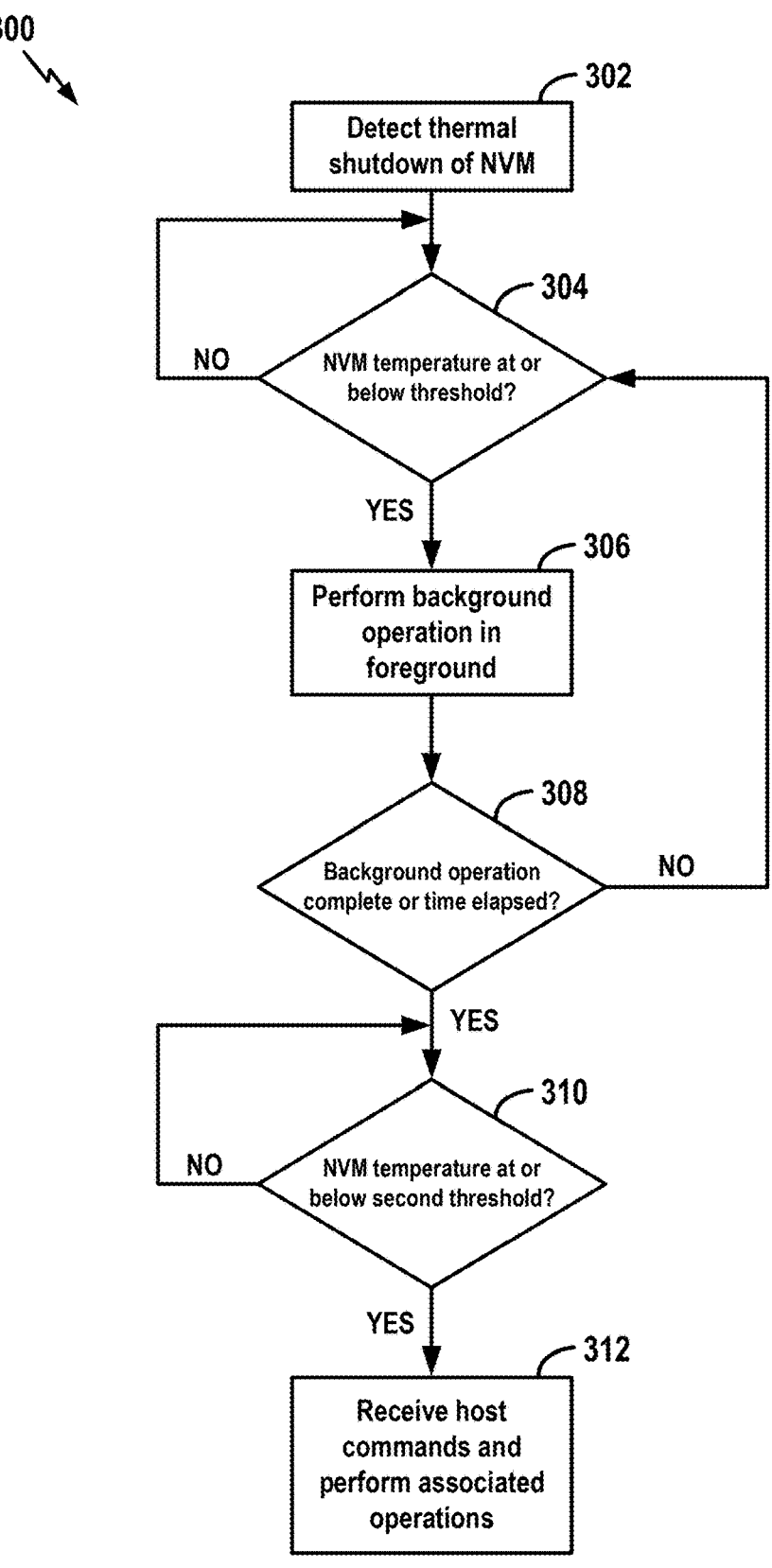
FIG. 3 is a flowchart illustrating a thermal management process for performing a background operation during thermal shutdown of a non-volatile memory (NVM) in accordance with some aspects of the disclosure.

FIG. 3 is a flowchart illustrating a thermal management process 300 for performing a background operation during thermal shutdown of a non-volatile memory (NVM) in accordance with some aspects of the disclosure. The process 300 may be performed by firmware running in the SSD/DSD controller 108 (or thermal shutdown manager 116) of the SSD 104 of FIG. 1, or any other suitably equipped device controller.

In an aspect, thermal shutdown of the NVM (e.g., NVM 114, NAND) halts all NVM operations leading to ongoing host command failures (e.g., due to timeouts or incorrect responses). Because the data storage device (e.g., SSD 104) has already failed to service the host commands during the thermal shutdown, the data storage device may utilize the time waiting for the NVM to cool down and return to an operational temperature to perform one or more background operations (e.g., garbage collection) in the foreground (as a foreground operation). By performing background operations while the NVM is in a thermal shutdown state, the data storage device will avoid having to perform the background operations when the data storage device resumes servicing host commands and when the NVM is out of the thermal shutdown state, which may otherwise lead to another NVM temperature increase triggering another thermal shutdown. Here, a background operation refers to a process that runs independently of a user or host. A process that depends on a user/host to start and/or interact with the process may be referred to as a foreground operation.

At block 302, the process detects that the thermal shutdown of the NVM has occurred. For example, the process may detect the thermal shutdown based on a signal from the thermal shutdown manager 116.

At block 304, the process determines (e.g., via a signal from the one or more component temperature sensors 120) whether the temperature of the NVM is at or below a threshold temperature. In an aspect, the threshold temperature may be defined as a temperature X at which the SSD/DSD controller 108 may begin performing one or more background operations (e.g., garbage collection) while the NVM is in the thermal shutdown state.

If the NVM temperature is at or below the threshold temperature, the process proceeds to block 306. At block 306, the process performs the one or more background operations in the foreground (as a foreground operation).

At block 308, the process determines whether the one or more background operations have been completely performed or whether a maximum time T for performing the one or more background operations has elapsed. The maximum time T may be defined based on a product requirement (e.g., a DSD requirement).

If the one or more background operations are completely performed or the maximum time T has elapsed, the process proceeds to block 310. At block 310, the process determines (e.g., via a signal from the one or more component temperature sensors 120) whether the temperature of the NVM is at or below a second threshold temperature. In an aspect, the second threshold temperature may be defined as a temperature Y at which the NVM is safe to operate and out of the thermal shutdown state. The temperature Y may be defined based on a product requirement (e.g., a DSD requirement).

If the NVM temperature is at or below the second threshold temperature, the process proceeds to block 312. At block 312, the process resumes receiving host commands (e.g., from host 102) and performs the operations associated with the commands in connection with the NVM.

FIG. 4 is a flowchart illustrating a thermal management process 400 of a data storage device in accordance with some aspects of the disclosure. The process 400 may be performed by firmware running in the SSD/DSD controller 108 (or thermal shutdown manager 116) of FIG. 1, or any other suitably equipped device controller.

Referring to FIG. 4, at block 402, the process receives, from a host (e.g., host 102), a host command (for performing an operation) to be performed in connection with a first NVM (e.g., NVM 114, NAND). The host command includes a starting logical block address (LBA) and a transfer length. For example, the host command may be a write, read, or erase command of data to be performed with respect to the first NVM.

At block 404, the process stores the starting LBA and the transfer length in a second NVM. In some aspects, the first and second NVMs are the same NVM (i.e., the host command information is stored in the first NVM and the second NVM is not needed). In other aspects, the first and second NVMs are different NVMs. At block 406, the process attempts to perform the host command.

At block 408, the process detects, before completion of the performance of the host command, a thermal shutdown state of the first NVM. For example, the process may detect the thermal shutdown state based on a signal from the thermal shutdown manager 116. Notably, during the thermal shutdown state, any host commands not completely performed (e.g., operation associated with a last received host command) prior to the thermal shutdown are discarded by the SSD/DSD controller 108 and residual data stored in the first NVM in association with the incompletely performed host command will remain in the first NVM.

At block 410, the process invalidates, using the stored starting LBA and the stored transfer length, the residual data stored in the first NVM in association with partial completion of the host command prior to the thermal shutdown state. In an aspect, if the host command partially completed prior to the thermal shutdown state is a partially completed write command, then the process invalidates the residual data by performing, using the stored starting LBA and the stored transfer length, garbage collection on the residual data (e.g., via garbage collection manager 118) when the first NVM is no longer in the thermal shutdown state. Additionally or alternatively, the process may invalidate the residual data by performing, using the stored starting LBA and the stored transfer length, garbage collection on the residual data during the thermal shutdown state of the first NVM.

In another aspect, if the host command partially completed prior to the thermal shutdown state is a partially completed erase command, then the process invalidates the residual data by continuing to erase the residual data based on the stored starting LBA and the stored transfer length when the first NVM is no longer in the thermal shutdown state (e.g., NVM temperature falls below temperature threshold) and prior to performing additional host commands. Additionally or alternatively, the process may invalidate the residual data by continuing to erase the residual data based on the stored starting LBA and the stored transfer length during the thermal shutdown state of the first NVM and prior to performing additional host commands, continuing to erase the residual data as part of performing garbage collection on the residual data based on the stored starting LBA and the stored transfer length when the first NVM is no longer in the thermal shutdown state, or continuing to erase the residual data as part of performing garbage collection on the residual data based on the stored starting LBA and the stored transfer length during the thermal shutdown state of the first NVM.

FIG. 5 is a flowchart illustrating a thermal management process 500 of a data storage device in accordance with some aspects of the disclosure. The process 500 may be performed by firmware running in the SSD/DSD controller 108 (or thermal shutdown manager 116) of FIG. 1, or any other suitably equipped device controller. In an aspect, the process 500 may incorporate the process 400 of FIG. 4 as a sub-process that is performed prior to beginning the process 500 shown in FIG. 5.

Referring to FIG. 5, at block 502, the process may further receive from the host during the thermal shutdown state of the first NVM, one or more additional host commands. As such, at block 504, the process determines whether the one or more additional host commands are to be performed in connection with the first NVM. In response to a determination that the one or more additional host commands are not to be performed in connection with the first NVM, at block 506, the process performs the one or more additional host commands during the thermal shutdown state of the first NVM. In response to a determination that the one or more additional host commands are to be performed in connection with the first NVM, the process proceeds to block 508. At block 508, the process stores the received one or more additional host commands in a queue.

At block 510, the process may send, to the host, one or more response messages in response to the received one or more additional host commands. The one or more response messages may indicate that the one or more additional host commands cannot be performed until a preselected delay period has elapsed. For example, a response message may be a command response having a bit set to indicate "illegal error" and/or "busy."

At block 512, the process performs the one or more additional host commands when the first NVM is no longer in the thermal shutdown state.

Figure 6:
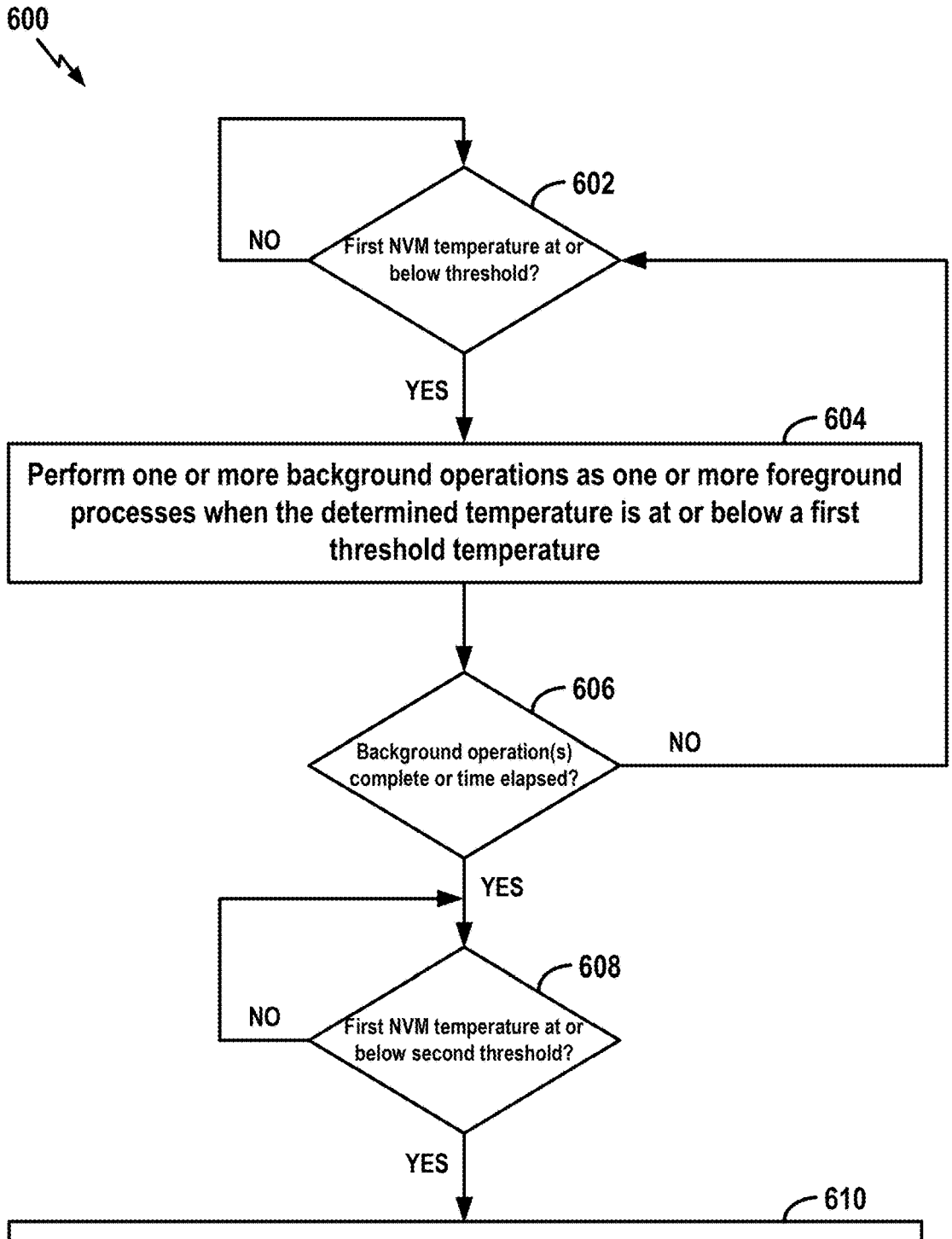

FIG. 6 is a flowchart illustrating a thermal management process 600 of a data storage device in accordance with some aspects of the disclosure. The process 600 may be performed by firmware running in the SSD/DSD controller 108 (or thermal shutdown manager 116) of FIG. 1, or any other suitably equipped device controller. In an aspect, the process 600 may incorporate the process 400 of FIG. 4 as a sub-process that is performed prior to beginning the process 600 shown in FIG. 6.

Referring to FIG. 6, at block 602, the process determines (e.g., via a signal from the one or more component temperature sensors 120) a temperature of the first NVM and whether the temperature is at or below a first threshold temperature after detecting the thermal shutdown state. In an aspect, the first threshold temperature may be defined as a temperature at which the SSD/DSD controller 108 may begin performing a background operation (e.g., garbage collection) while the first NVM is in the thermal shutdown state.

At block 604, the process performs one or more background operations as one or more foreground processes when the determined temperature is at or below the first threshold temperature.

At block 606, the process determines whether the one or more background operations are completely performed or whether a maximum time for performing the one or more background operations has elapsed. The maximum time may be defined based on product requirement.

At block 608, the process determines (e.g., via a signal from the one or more component temperature sensors 120) whether the temperature of the first NVM is at or below a second threshold temperature, wherein the second threshold temperature is less than the first threshold temperature. In an aspect, the second threshold temperature may be defined as a temperature at which the first NVM is safe to operate and no longer in the thermal shutdown state. The second threshold temperature may be defined based on product requirement.

At block 610, the process receives, from the host, one or more additional host commands to be performed in connection with the first NVM, and performs the one or more additional host commands when: (1) performance of the one or more background operations is complete or the maximum time for performing the one or more background operations has elapsed; and (2) the temperature of the first NVM is at or below the second threshold temperature.

In an aspect, the process 500 of FIG. 5 is separate from the process 600 of FIG. 6. As stated above, each of the process 500 and the process 600 may incorporate the process 400 of FIG. 4 as a sub-process that is performed prior to beginning the respective processes 500, 600, substantially as shown in FIGS. 4, 5, and 6. For example, in one aspect, each of the processes of FIG. 5 and FIG. 6 may be viewed as a continuation of the process of FIG. 4. In a further aspect, the processes 400, 500, and 600 are processes that may be performed separately from one another, in parallel with each other, and/or in a sequential manner.

Additional Exemplary Apparatus

FIG. 7 broadly illustrates a data storage device 700 configured in accordance with some aspects of the disclosure. The data storage device 700 includes one or more components 702 (including at least one non-volatile memory (NVM), e.g., first NVM and second NVM), one or more component temperature sensors 708, and a data storage device controller 704. The controller 704 includes a processor or processing circuit 706 configured to: receive, from a host, a host command to be performed in connection with the first NVM, the host command comprising a starting logical block address (LBA) and a transfer length; store the starting LBA and the transfer length in a second NVM; attempt to perform the host command; detect, before completion of the performance of the host command, a thermal shutdown state of the first NVM; and invalidate, using the stored starting LBA and the stored transfer length, residual data stored in the first NVM in association with partial completion of the host command prior to the thermal shutdown state.

In an aspect, if the host command partially completed prior to the thermal shutdown state is a partially completed write command, then the processor 706 configured to invalidate the residual data is configured to: perform, using the stored starting LBA and the stored transfer length, garbage collection on the residual data when the first NVM is no longer in the thermal shutdown state; and/or perform, using the stored starting LBA and the stored transfer length, garbage collection on the residual data during the thermal shutdown state of the first NVM.

In an aspect, if the host command partially completed prior to the thermal shutdown state is a partially completed erase command, then the processor 706 configured to invalidate the residual data is configured to: continue to erase the residual data based on the stored starting LBA and the stored transfer length when the first NVM is no longer in the thermal shutdown state and prior to performing additional host commands; continue to erase the residual data based on the stored starting LBA and the stored transfer length during the thermal shutdown state of the first NVM and prior to performing additional host commands; continue to erase the residual data as part of performing garbage collection on the residual data based on the stored starting LBA and the stored transfer length when the first NVM is no longer in the thermal shutdown state; and/or continue to erase the residual data as part of performing garbage collection on the residual data based on the stored starting LBA and the stored transfer length during the thermal shutdown state of the first NVM.

In an aspect, the processor 706 may be further configured to: receive, from the host during the thermal shutdown state of the first NVM, one or more additional host commands; determine whether the one or more additional host commands are to be performed in connection with the first NVM; and perform the one or more additional host commands during the thermal shutdown state of the first NVM in response to a determination that the one or more additional host commands are not to be performed in connection with the first NVM. In an aspect, the processor 706 may be further configured to: receive, from the host during the thermal shutdown state of the first NVM, one or more additional host commands to be performed in connection with the first NVM; store the received one or more additional host commands in a queue; and perform the one or more additional host commands when the first NVM is no longer in the thermal shutdown state.

In an aspect, the processor 706 may be further configured to: send, to the host, one or more response messages in response to the received one or more additional host commands, the one or more response messages indicating that the one or more additional host commands cannot be performed until a preselected delay period has elapsed.

In an aspect, the processor 706 may be further configured to: determine a temperature of the first NVM after detecting the thermal shutdown state; and perform one or more background operations as one or more foreground processes when the determined temperature is at or below a first threshold temperature.

In an aspect, the processor 706 may be further configured to receive, from the host, one or more additional host commands to be performed in connection with the first NVM, and perform the one or more additional host commands when: performance of the one or more background operations is complete or a maximum time for performing the one or more background operations has elapsed; and the determined temperature is at or below a second threshold temperature, wherein the second threshold temperature is less than the first threshold temperature.

Figure 8:
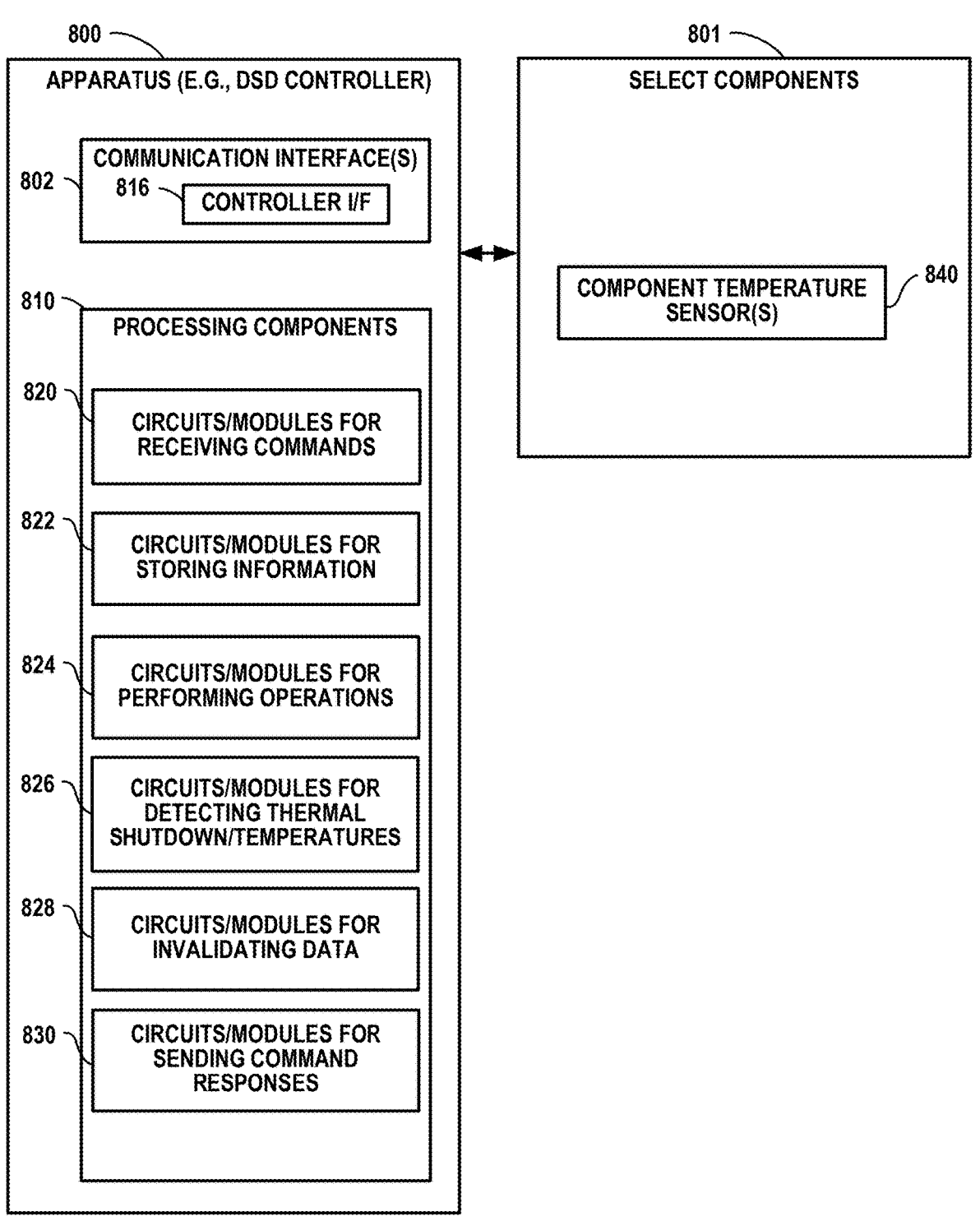
FIG. 8 is a schematic block diagram configuration for an exemplary data storage device configured in accordance with some aspects of the disclosure.

FIG. 8 illustrates an embodiment of an exemplary data storage device configured in accordance with some aspects of the disclosure. The data storage device, or components thereof, could embody or be implemented with an apparatus 800, e.g., data storage controller such as a DSD controller coupled to a non-volatile memory (not shown) and select components 801 including one or more component temperature sensors 840. In various implementations, the apparatus 800, or components thereof, could be a component of a processor, a controller, a computing device, a personal computer, a portable device, workstation, a server, a personal digital assistant, a digital camera, a digital phone, an entertainment device, a medical device, a self-driving vehicle control device, an edge device, or any other electronic device that stores, processes, or uses data.

The apparatus 800 includes a communication interface 802 including controller interface 816 and is coupled to the select components 801. The communication interface 802 is further coupled to the one or more component temperature sensors 840. These components can be coupled to and/or placed in electrical communication with one another via suitable components, represented generally by the connection line in FIG. 8. Although not shown, other circuits such as timing sources, peripherals, voltage regulators, and power management circuits may be provided, which will not be described any further.

The communication interface 802 of the apparatus 800 provides a means for communicating with other apparatuses over a transmission medium. In some implementations, the communication interface 802 includes circuitry and/or programming (e.g., a program) adapted to facilitate the communication of information bi-directionally with respect to one or more devices in a system. In some implementations, the communication interface 802 may be configured for wire-based communication. For example, the communication interface 802 could be a bus interface, a send/receive interface, or some other type of signal interface including circuitry for outputting and/or obtaining signals (e.g., outputting signal from and/or receiving signals into a DSD).

The select components 801 may include the one or more component temperature sensors 840 for detecting a temperature of at least one non-volatile memory (NVM). The select components 801 may be accessed by the processing components 810.

In one aspect, the apparatus 800 may also include volatile memory for storing instructions and other information to support the operation of the processing components 810.

The apparatus 800 includes various processing components 810 arranged or configured to obtain, process and/or send data, control data access and storage, issue or respond to commands, and control other desired operations. For example, the processing components 810 may be implemented as one or more processors, one or more controllers, and/or other structures configured to perform functions. According to one or more aspects of the disclosure, the processing components 810 may be adapted to perform any or all of the features, processes, functions, operations and/or routines described herein. For example, the processing components 810 may be configured to perform any of the steps, functions, and/or processes described with respect to FIGS. 1-7. As used herein, the term "adapted" in relation to processing components 810 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 1-7. The processing components 810 serve as an example of a means for processing. In various implementations, the processing components 810 may provide and/or incorporate, at least in part, functionality described above for the components of controller 108 of FIG. 1 or controller 704 of FIG. 7.

According to at least one example of the apparatus 800, the processing components 810 may include one or more of: circuits/modules 820 configured for receiving, from a host, a host command to be performed in connection with a first NVM, the host command including a starting logical block address (LBA) and a transfer length, receiving, from the host during the thermal shutdown state of the first NVM, one or more additional host commands to be (or not to be) performed in connection with the first NVM, and receiving, from the host, one or more other host commands to be (or not to be) performed in connection with the first NVM;

circuits/modules 822 configured for storing the starting LBA and the transfer length in a second NVM, and storing the received one or more additional host commands in a queue; circuits/modules 824 configured for attempting to perform the host command, performing the one or more additional/ other host commands, and performing one or more background operations as one or more foreground processes when the determined temperature is at or below a first threshold temperature; circuits/modules 826 configured for detecting, before completion of the performance of the host command, a thermal shutdown state of the first NVM, and determining a temperature of the first NVM (based on a signal from the one or more component temperature sensors 840) after detecting the thermal shutdown state; circuits/ modules 828 configured for invalidating, using the stored starting LBA and the stored transfer length, residual data stored in the first NVM in association with partial completion of the host command prior to the thermal shutdown state; and circuit/modules 830 configured for sending, to the host, one or more response messages in response to the received one or more additional host commands, the one or more response messages indicating that the one or more additional host commands cannot be performed until a preselected delay period has elapsed.

In at least some examples, means may be provided for performing the functions illustrated in FIG. 8 and/or other functions illustrated or described herein. For example, the means may include one or more of: means, such as circuits/ modules 820, for receiving, from a host, a host command to be performed in connection with a first NVM, the host command including a starting logical block address (LBA) and a transfer length, for receiving, from the host during the thermal shutdown state of the first NVM, one or more additional host commands to be (or not to be) performed in connection with the first NVM, and for receiving, from the host, one or more other host commands to be (or not to be) performed in connection with the first NVM; means, such as circuits/modules 822, for storing the starting LBA and the transfer length in a second NVM, and for storing the received one or more additional host commands in a queue, means, such as circuits/modules 824, for attempting to perform the host command, for performing the one or more additional/other host commands, and for performing one or more background operations as one or more foreground processes when the determined temperature is at or below a first threshold temperature; means, such as circuits/modules 826, for detecting, before completion of the performance of the host command, a thermal shutdown state of the first NVM, and for determining a temperature of the first NVM (based on a signal from the one or more component temperature sensors 840) after detecting the thermal shutdown state; means, such as circuits/modules 828, for invalidating, using the stored starting LBA and the stored transfer length, residual data stored in the first NVM in association with partial completion of the host command prior to the thermal shutdown state; and means, such as circuits/modules 830, for sending, to the host, one or more response messages in response to the received one or more additional host commands, the one or more response messages indicating that the one or more additional host commands cannot be performed until a preselected delay period has elapsed.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of nonlimiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect," or similar language means that a particular feature, structure, or characteristic described in connection with the embodiment is included in at least one embodiment of the present disclosure. Thus, appearances of the phrases "in one embodiment," "in an embodiment," "in one aspect," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
a first non-volatile memory (NVM); and
one or more processors coupled to the first NVM, the one or more processors, individually or collectively, configured to:
receive, from a host, a host command to be performed in connection with the first NVM, the host command comprising a starting logical block address (LBA) and a transfer length;
store the starting LBA and the transfer length in a second NVM;
attempt to perform the host command;
detect, before completion of the performance of the host command, a thermal shutdown state of the first NVM; and
invalidate, using the stored starting LBA and the stored transfer length, residual data stored in the first NVM in association with partial completion of the host command prior to the thermal shutdown state.

2. The data storage device of claim 1, wherein if the host command partially completed prior to the thermal shutdown state is a partially completed write command, then the one or more processors configured to invalidate the residual data are further configured to at least one of:
perform, using the stored starting LBA and the stored transfer length, garbage collection on the residual data when the first NVM is no longer in the thermal shutdown state; or
perform, using the stored starting LBA and the stored transfer length, garbage collection on the residual data during the thermal shutdown state of the first NVM.

3. The data storage device of claim 1, wherein if the host command partially completed prior to the thermal shutdown state is a partially completed erase command, then the one or more processors configured to invalidate the residual data are further configured to at least one of:
continue to erase the residual data based on the stored starting LBA and the stored transfer length when the first NVM is no longer in the thermal shutdown state and prior to performing additional host commands;
continue to erase the residual data based on the stored starting LBA and the stored transfer length during the thermal shutdown state of the first NVM and prior to performing additional host commands;
continue to erase the residual data as part of performing garbage collection on the residual data based on the stored starting LBA and the stored transfer length when the first NVM is no longer in the thermal shutdown state; or
continue to erase the residual data as part of performing garbage collection on the residual data based on the stored starting LBA and the stored transfer length during the thermal shutdown state of the first NVM.

4. The data storage device of claim 1, wherein the one or more processors are further configured to:
receive, from the host during the thermal shutdown state of the first NVM, one or more additional host commands;

determine whether the one or more additional host commands are to be performed in connection with the first NVM; and perform the one or more additional host commands during the thermal shutdown state of the first NVM in response to a determination that the one or more additional host commands are not to be performed in connection with the first NVM.

5. The data storage device of claim 1, wherein the one or more processors are further configured to:

receive, from the host during the thermal shutdown state of the first NVM, one or more additional host commands to be performed in connection with the first NVM;

store the received one or more additional host commands in a queue; and perform the one or more additional host commands when the first NVM is no longer in the thermal shutdown state.

6. The data storage device of claim 5, wherein the one or more processors are further configured to:

send, to the host, one or more response messages in response to the received one or more additional host commands, the one or more response messages indicating that the one or more additional host commands cannot be performed until a preselected delay period has elapsed.

7. The data storage device of claim 1, wherein the one or more processors are further configured to:

determine a temperature of the first NVM after detecting the thermal shutdown state; and perform one or more background operations as one or more foreground processes when the determined temperature is at or below a first threshold temperature.

8. The data storage device of claim 7, wherein the one or more processors are further configured to receive, from the host, one or more additional host commands to be performed in connection with the first NVM, and to perform the one or more additional host commands when:

performance of the one or more background operations is complete or a maximum time for performing the one or more background operations has elapsed; and the determined temperature is at or below a second threshold temperature, wherein the second threshold temperature is less than the first threshold temperature.

9. A method for use with a data storage device comprising a first non-volatile memory (NVM), the method comprising:

receiving, from a host, a host command to be performed in connection with the first NVM, the host command comprising a starting logical block address (LBA) and a transfer length;

storing the starting LBA and the transfer length in a second NVM;

attempting to perform the host command;

detecting, before completion of the performance of the host command, a thermal shutdown state of the first NVM; and invalidating, using the stored starting LBA and the stored transfer length, residual data stored in the first NVM in association with partial completion of the host command prior to the thermal shutdown state.

10. The method of claim 9, wherein if the host command partially completed prior to the thermal shutdown state is a partially completed write command, invalidating the residual data comprises at least one of:

performing, using the stored starting LBA and the stored transfer length, garbage collection on the residual data when the first NVM is no longer in the thermal shutdown state; or performing, using the stored starting LBA and the stored transfer length, garbage collection on the residual data during the thermal shutdown state of the first NVM.

11. The method of claim 9, wherein if the host command partially completed prior to the thermal shutdown state is a partially completed erase command, invalidating the residual data comprises at least one of:

continuing to erase the residual data based on the stored starting LBA and the stored transfer length when the first NVM no longer in the thermal shutdown state and prior to performing additional host commands;

continuing to erase the residual data based on the stored starting LBA and the stored transfer length during the thermal shutdown state of the first NVM and prior to performing additional host commands;

continuing to erase the residual data as part of performing garbage collection on the residual data based on the stored starting LBA and the stored transfer length when the first NVM is no longer in the thermal shutdown state; or continuing to erase the residual data as part of performing garbage collection on the residual data based on the stored starting LBA and the stored transfer length during the thermal shutdown state of the first NVM.

12. The method of claim 9, further comprising:

receiving, from the host during the thermal shutdown state of the first NVM, one or more additional host commands to be performed in connection with the first NVM;

storing the received one or more additional host commands in a queue; and performing the one or more additional host commands when the first NVM is no longer in the thermal shutdown state.

13. The method of claim 12, further comprising:

sending, to the host, one or more response messages in response to the received one or more additional host commands, the one or more response messages indicating that the one or more additional host commands cannot be performed until a preselected delay period has elapsed.

14. The method of claim 9, further comprising:

determining a temperature of the first NVM after detecting the thermal shutdown state; and performing one or more background operations as one or more foreground processes when the determined temperature is at or below a first threshold temperature.

15. The method of claim 14, further comprising receiving, from the host, one or more additional host commands to be performed in connection with the first NVM, and performing the one or more additional host commands when:

performance of the one or more background operations is complete or a maximum time for performing the one or more background operations has elapsed; and the determined temperature is at or below a second threshold temperature, wherein the second threshold temperature is less than the first threshold temperature.

16. A data storage device comprising a first non-volatile memory (NVM), the data storage device comprising:

means for receiving, from a host, a host command to be performed in connection with the first NVM, the host command comprising a starting logical block address (LBA) and a transfer length;

means for storing the starting LBA and the transfer length in a second NVM;

means for attempting to perform the host command;

means for detecting, before completion of the performance of the host command, a thermal shutdown state of the first NVM; and means for invalidating, using the stored starting LBA and the stored transfer length, residual data stored in the first NVM in association with partial completion of the host command prior to the thermal shutdown state.

17. The data storage device of claim 16, further comprising:

means for receiving, from the host during the thermal shutdown state of the first NVM, one or more additional host commands to be performed in connection with the first NVM;

means for storing the received one or more additional host commands in a queue; and means for performing the one or more additional host commands when the first NVM is no longer in the thermal shutdown state.

18. The data storage device of claim 17, further comprising:

means for sending, to the host, one or more response messages in response to the received one or more additional host commands, the one or more response messages indicating that the one or more additional host commands cannot be performed until a preselected delay period has elapsed.

19. The data storage device of claim 16, further comprising:

means for determining a temperature of the first NVM after detecting the thermal shutdown state; and means for performing one or more background operations as one or more foreground processes when the determined temperature is at or below a first threshold temperature.

20. The data storage device of claim 19, further comprising means for receiving, from the host, one or more additional host commands to be performed in connection with the first NVM, and means for performing the one or more additional host commands when:

performance of the one or more background operations is complete or a maximum time for performing the one or more background operations has elapsed; and the determined temperature is at or below a second threshold temperature, wherein the second threshold temperature is less than the first threshold temperature.

* * * * *